United States Patent
Eriksen

(10) Patent No.: US 6,715,969 B2
(45) Date of Patent: Apr. 6, 2004

(54) HAND-HELD TURRET DRILL

(76) Inventor: Steen Mandsfelt Eriksen, Larsensvej 10, Græsted (DK), 3230

( * ) Notice: Subject to any disclaimer, the term of this patent is extended or adjusted under 35 U.S.C. 154(b) by 0 days.

(21) Appl. No.: 10/395,204

(22) Filed: Mar. 25, 2003

(65) Prior Publication Data

US 2003/0165365 A1 Sep. 4, 2003

Related U.S. Application Data

(63) Continuation of application No. PCT/DK01/00623, filed on Sep. 28, 2001.

(30) Foreign Application Priority Data

Sep. 28, 2000 (DK) .................................. 2000 01438

(51) Int. Cl.⁷ .............................................. B23B 45/00
(52) U.S. Cl. ..................................... 408/35; 408/239 R
(58) Field of Search ..................... 173/214, 46; 408/35, 408/124, 239 R, 241 R, 110; 483/50, 51, 55, 56; 81/490, 439; 7/158, 165

(56) References Cited

U.S. PATENT DOCUMENTS

| | | | |
|---|---|---|---|
| 1,924,383 A | | 8/1933 | Stampfli |
| 2,303,565 A | | 12/1942 | Luna |
| 2,679,770 A | * | 6/1954 | Carter et al. ................. 173/214 |
| 2,919,609 A | * | 1/1960 | Klingbeil .................... 408/117 |
| 4,167,362 A | | 9/1979 | Dietrich ........................ 408/35 |
| 4,604,005 A | * | 8/1986 | Russ ............................ 408/35 |
| 5,022,131 A | * | 6/1991 | Hobbs ........................... 29/40 |
| 5,065,498 A | * | 11/1991 | McKenzie .................... 483/57 |
| 5,149,230 A | * | 9/1992 | Nett ............................. 408/42 |
| 5,346,453 A | * | 9/1994 | Rivera-Bottzeck ............. 483/1 |
| 5,573,358 A | | 11/1996 | Gobbers et al. ............... 408/35 |
| 5,597,275 A | * | 1/1997 | Hogan ...................... 408/239 R |
| 5,893,685 A | * | 4/1999 | Olson et al. .................. 408/35 |
| 6,506,002 B1 | * | 1/2003 | Cummins ..................... 408/35 |

FOREIGN PATENT DOCUMENTS

| | | | | |
|---|---|---|---|---|
| DE | 549092 | | 6/1989 | |
| DE | 3831132 | | 6/1989 | |
| DE | 4340740 | * | 6/1995 | .................. 408/35 |
| GB | 633408 | | 12/1949 | |
| GB | 707022 | | 4/1954 | |
| GB | 740665 | | 11/1955 | |
| GB | 1073681 | * | 6/1967 | .................. 408/35 |

* cited by examiner

Primary Examiner—Daniel W. Howell
(74) Attorney, Agent, or Firm—Winston & Strawn LLP

(57) ABSTRACT

A hand-held drill that includes a casing with a rotatably journaled driving spindle for during operation rotating a driven spindle on a turret head having at least two driven spindles. The drill also has a first coupling part on the driven spindle and an opposite second coupling part connected in a non-rotatable manner to the driving spindle and movable between a connected and disconnected position in relation to this driving spindle, and a guideway with a slide movably received in the guideway. The second coupling part is rotatably extending through a channel in the slide but is secured in this channel against axial movement. Furthermore, the drill comprises one locking notch in the turret head for each driven spindle and a locking pawl on the slide. When one of the driven spindles are coupled with the driving spindle, the locking pawl simultaneously locks the turret head on the casing of the drill. The drill according to the invention has a simple and stably functioning structure and is easy and safe to operate.

13 Claims, 8 Drawing Sheets

HAND-HELD TURRET DRILL

CROSS-REFERENCE TO RELATED APPLICATIONS

This application is a continuation of the US national stage of International application PCT/DK01/00623 filed Sep. 28, 2001, the entire content of which is expressly incorporated herein by reference thereto.

BACKGROUND ART

The invention relates to a hand-held turret drill. This type of drill generally comprises a casing and a driving spindle rotatably journaled in the casing for rotating a driven spindle during operation. The driven spindle is in an operatable position in which it is coaxially flush with the driving spindle. The drill includes a driving motor for directly or indirectly rotating the driving spindle and a coupling for connecting and disconnecting the engagement of the driven spindle with the driving spindle. The drill also includes a turret head that is revolvably mounted on the casing and is provided with at least two driven spindles. The turret head is arranged in such a way that the spindles can be rotated one by one into the operatable position. A first coupling part of the coupling is made on the end of the driven spindle that faces the driving spindle, while an opposite second coupling part is connected to the driving spindle in a non-rotatable manner and is axially movable between a connected and disconnected position in relation to this driving spindle. The drill further includes means for manually moving the second coupling part between its connected and disconnected positions.

Generally, hand-held drills have chucks for clamping a rotary tool. In many cases, such a drill is employed for jobs that require consecutive use of various tools which therefore must be clamped one by one into the chuck.

An example of such a job is one that simply consists in screwing a wood screw into a piece of wood. When a conventional drill with one spindle is employed for this purpose, the following operations are required.

A drill bit is clamped in the chuck while the drill is inoperative. A hole is predrilled in the wood by actuating the drill. The drill is dwelled and the drill bit removed from the hole. The chuck is opened and the drill bit is removed from the chuck. A screw bit is then clamped in the chuck instead and the screw is screwed into the predrilled hole by reactuating the drill.

If the job only comprises a single or a small number of screws, it is still manageable to employ a drill with only one operatable spindle despite the many operations. However, this is not the case if the job comprises many screws. Then, the many tool changes will really be an inconvenience to the operator just as they will take up a considerable part of the total time spent on doing the job.

Attempts have been made at trying to solve this problem. One attempt includes providing a hand-held drill with several driven spindles which one at the time are coupled into operative engagement with the driving spindle of the drill. Each of the driven spindles then has a chuck that provides a a tool that does not require change as long as the same kind of work is done repeatedly. Thereby, many tool changes are saved.

Such a drill is known from U.S. Pat. No. 5,573,358. In this patent, there are two driven spindles both journaled in a revolvable arrangement of bearings which can bring either one of the driven spindles into operative engagement with the drive shaft of the drill upon turning. During such a turning manoeuvre, the driven spindles will travel in a large curve. Thereby, the structure with the projecting spindles and their chucks will become unstable in itself. The revolvable arrangement of bearings must be supported by a guideway, but as the spindle with the tool that is not in use at the moment is hanging out to the side, the drill becomes lopsided and unwieldy as well as difficult to operate in narrow spaces, e.g. in a corner. When changing between the two driven spindles, the revolvable arrangement of bearings is turned back and forth in relation to the rest of the drill. This known structure is relatively complex, is hard to manage, is difficult to employ and has a limited operating range.

Thus, there is a need for an improved drill that remedies the problems of the art. The present invention now addresses this need and provides one solution to these problems.

SUMMARY OF THE INVENTION

The invention relates to a hand-held drill of the type described above. The drill generally comprises a casing; a driven spindle; a driving spindle rotatably journaled in the casing for engaging and rotating the driven spindle during operation, with the driven spindle being in an operatable position in which it is coaxially flush with the driving spindle; a driving motor for directly or indirectly rotating the driving spindle; a coupling for connecting and disconnecting engagement of the driven spindle with the driving spindle, with the coupling including a first coupling part made on the end of the driven spindle that is facing the driving spindle, and an opposite second coupling part non-rotatably connected to the driving spindle and axially movable between a connected and disconnected position in relation to the driving spindle; a turret head revolvably mounted on the casing and provided with at least two driven spindles with the turret head arranged in such a way that the spindles can be rotated one by one into an operatable position with the driven spindle; and means for manually displacing the second coupling part between its connected and disconnected positions. This drill preferably includes a guideway mounted in the casing and extending parallel to the axis of the driving spindle; and a slide movably received in the guideway and having a through channel extending coaxially with the driving spindle, whereby the second coupling part rotatably extends through the slide channel and is secured therein against axial movement.

The drill may also include a lock having a first locking part on the turret head for each driven spindle and a second locking part on the slide, with the second locking part being arranged to engage in a locking manner with one of the first locking parts when the corresponding driven spindle is in the operatable position and the first and second coupling part are coupled together. The lock generally may include a locking pawl on the slide and a notch in the turret head for each driven spindle, or a locking pawl on the turret head for each driven spindle and a recess in the slide.

The means for manually moving the second coupling part between its connected and disconnected position generally comprises a movable member associated with the second coupling part or with the slide. This member preferably comprises at least one finger knob that extends out through the casing.

The second coupling part may be a coupling bar extending in an axially movable but non-rotatable manner into an axially extending end hole in the driving spindle and extending in a rotatable manner but secured against axial movement through the slide channel. The second coupling part preferably comprises a bushing journaled in a rotatable manner but secured against axial movement in the channel of the slide and a coupling bar extending into or through the bushing in a non-rotatable manner and secured against axial movement and into an axially extending end hole in the driving spindle in a non-rotatable and movable manner.

The drill preferably includes at least one biasing member for affecting the slide with a force acting in direction towards the driven spindle. A convenient biasing member is a coupling spring that provides spring power against the slide.

In another embodiment, the drill comprises a base for supporting the drill on a supporting face, wherein a portion of the base is arranged to be moved between a retracted position of use and an advanced position of support.

BRIEF DESCRIPTION OF THE DRAWINGS

The invention will be explained in greater detail below, describing only exemplary embodiments with reference to the drawing, in which.

DETAILED DESCRIPTION OF PREFERRED EMBODIMENTS

Figure 1:
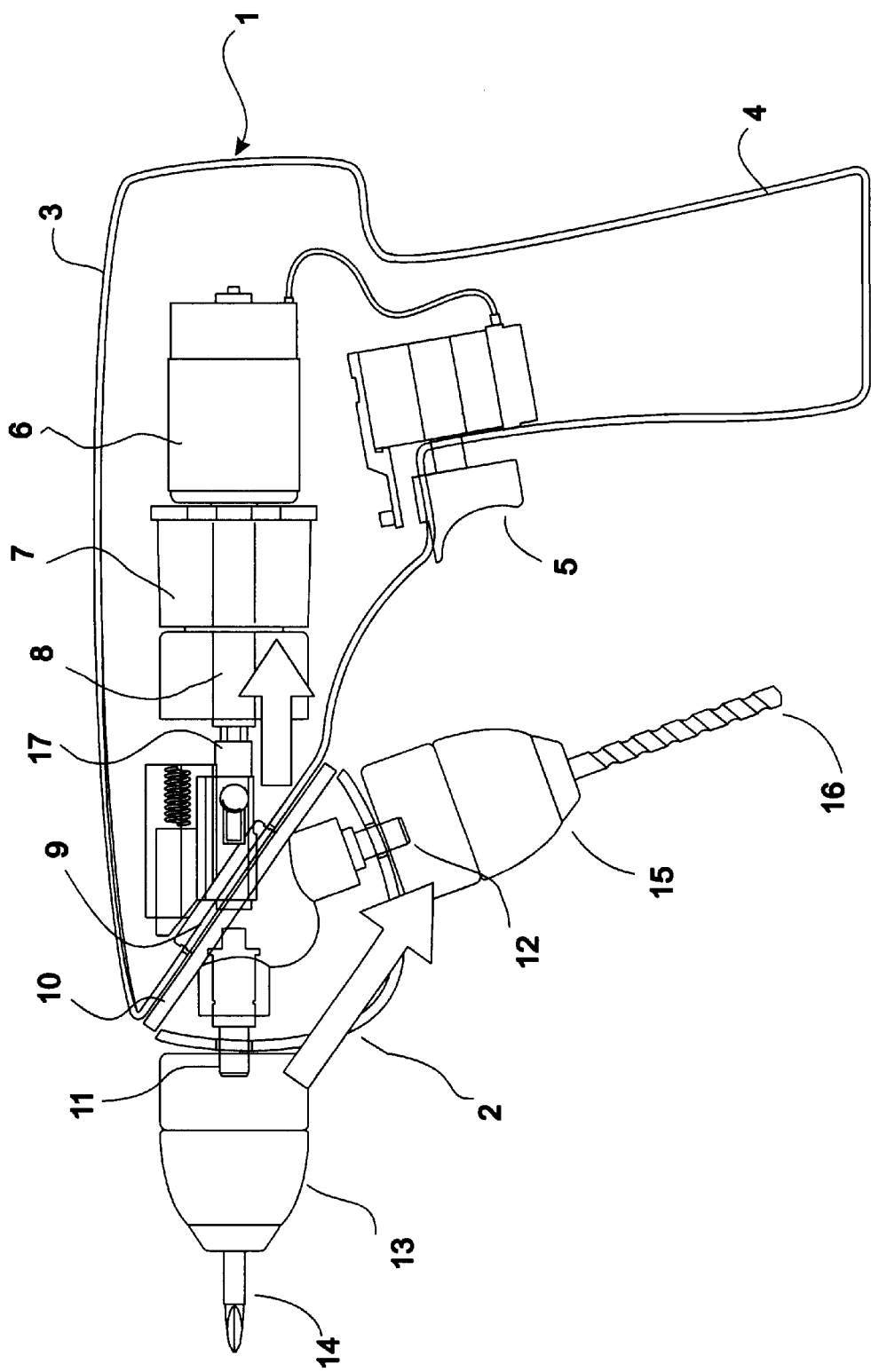
FIG. 1 is a side elevational view of a drill according to the invention with a turret head and a disconnected driven spindle with a screw bit, partly in axial section.

The present invention relates to hand-held turret drill that has a simple, stably functioning design and that is easy and safe to operate. The novel and unique features which achieve this are the provision of a guideway extending parallel to the axis of the driving spindle and a slide movably received in the guideway and having a through channel extending coaxially to the driving spindle. Thus, the second coupling part can extend rotatably through the channel of the slide and be retained in the channel against axial movement.

With this design, a driven spindle can now be coupled into and out of engagement with the driving spindle easily and quickly quite simply by operating the coupling instead of conventionally having to move the turret head with its chucks and tools in relation to the rest of the drill.

The driven spindle, which currently is in the operatable position on the drill, is coupled into and out of the engagement with the driving spindle by axially moving the second coupling part back and forth during which the second coupling part is effectively supported and guided.

In a constructively simple variant of this embodiment, the second coupling part can merely consist of a coupling bar which is extending into an axially extending end hole in the driving spindle in an axially movable but non-rotatable manner and is extending through the channel of the slide in a rotatable manner but secured against axial displacement.

Alternatively, the second coupling part can consist of a bushing journaled in the channel of the slide in a rotatable manner but secured against axial displacement, and a coupling bar extending into or through the bushing in a non-rotatable manner secured against axial displacement and into an axially extending end hole in the driving spindle in a non-rotatable and movable manner.

In the casing, a coupling spring or similar biasing means for affecting the slide with a force acting in direction towards the driven spindle can be located to automatic couple the second coupling part to the first coupling part so that the respective driven spindle can be employed to perform an operation with a rotary tool clamped in e.g. a chuck on the spindle.

When a second driven spindle subsequently is to be turned into the operatable position on the drill, the second coupling part first has to be disconnected from its engagement with the first coupling part. Advantageously, this disconnection can take place by means of finger knobs mounted on the slide or the second coupling part and extending out through the casing.

A driven spindle with a rotary tool used for a specific operation is disconnected in a simple manner by pushing the finger knobs. Then, the spindle with the next rotary tool to be used is turned into the operatable position on the drill after which the finger knobs are released. Thereby, the second coupling part is forced into engagement with the first coupling part of the new spindle by means of the spring power of the coupling spring whereby the new spindle is automatically coupled together with the driving spindle. Now, the associated rotary tool is immediately ready for being operatively used.

However, it is important that the turret head is locked securely in the new angular position in relation to the casing of the drill when the new rotary tool is used.

For this purpose, the drill can be provided with a lock that advantageously can consist of at least one on the slide and a corresponding recess in the turret head for each driven spindle or a catch in the turret head for each driven spindle and a corresponding recess in the slide.

When the coupling spring automatically couples the second coupling part to the first part, the above lock will now simultaneously lock the turret head and the drill together. Then, the wanted rotary operation can be performed safely and effectively and without any risk of the operator getting hurt because of the turret head unintentionally beginning to rotate.

In many cases a hand-held drill has a base for placing the drill on when it is not in use. However, the weight of the turret head and its associate components will move the centre of gravity of the entire drill forward so that the drill is likely to overturn when it is placed on a supporting face. In an advantageous embodiment the base or a lower part of this base can be disposed movably in relation to the rest of the drill. When the base or base part is moved forward, the centre of gravity of the drill will be within the surface of support of the base. When the drill is to be used, the base or base part is pulled back to a position that is convenient to the operator.

Figure 2:
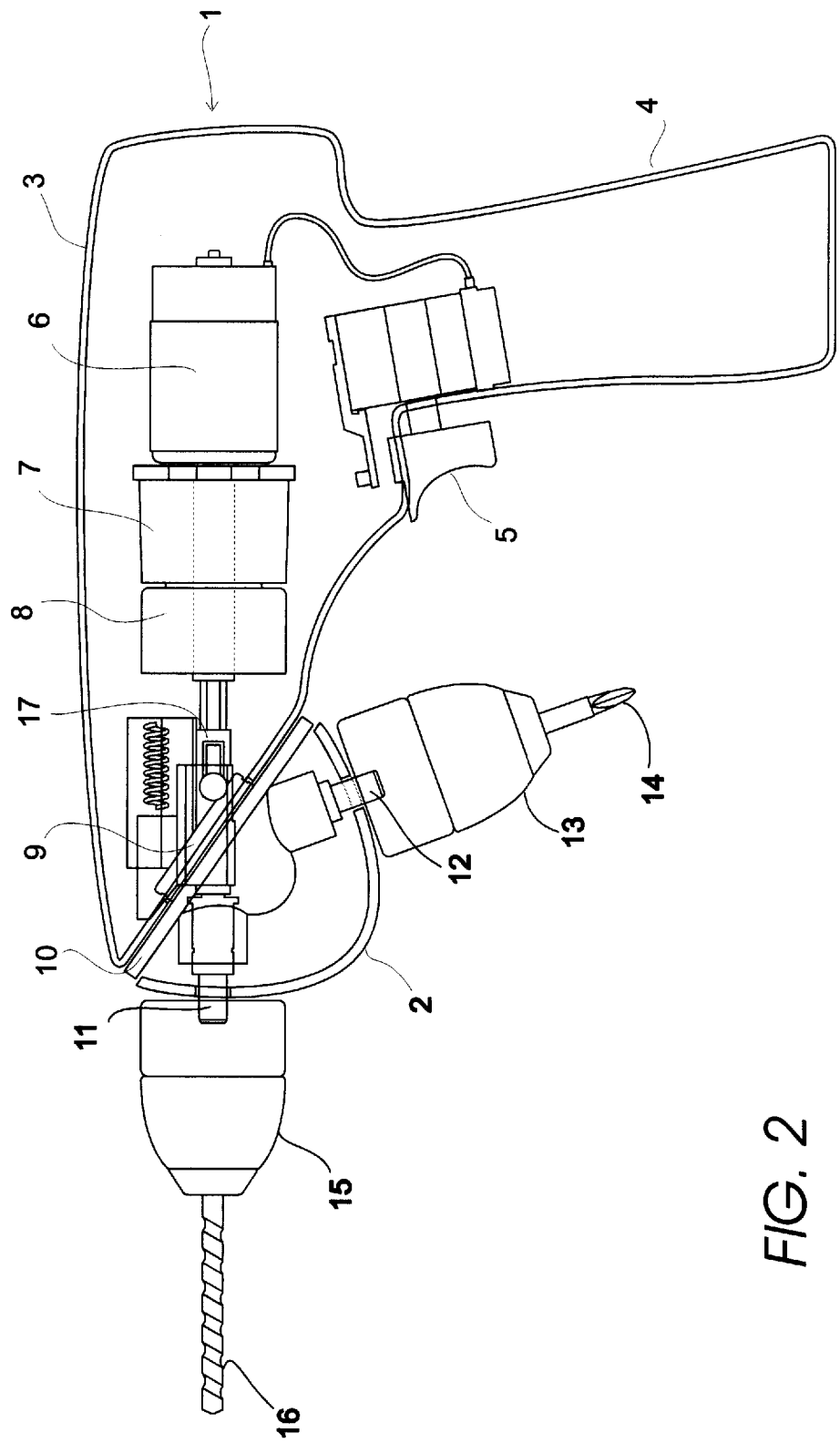
FIG. 2 is a view of the drill in FIG. 1 but with an connected second driven spindle with a drill bit.

FIGS. 1 and 2 show a drill 1 according to the invention with a turret head 2. The drill has a casing 3 with a handle 4. A trigger 5 is found in the handle for actuating the drill. A driving motor 6 is also found in the casing for via a gearing 7 rotating a driving spindle 8 which is rotatably journaled in the casing.

By means of a bearing 9, the turret head 2 is revolvably mounted on an oblique face 10 made on the front end of the casing and forming and angle of preferably 45°–65° with the axis of the driving spindle.

In the case shown, the turret head is provided with two driven spindles 11 and 12 mutually forming an angle which is twice as large, that is an angle of between 90° and 130°. Thereby, the tool which at a given moment is inactive will advantageously be extending in approximately the same direction as the handle so that it will not be in the way for operating the drill or happen to hit the handle when the turret heat is attempted turned.

A chuck 13 with a clamped screw bit 14 is mounted on the spindle 11, and a chuck 15 with a clamped drill bit 16 is mounted on the spindle 12.

The drill comprises a coupling 17 for connecting and disconnecting the driven spindle which at a given moment is in operatable position in which its axis is extending in continuation of the axis of the drive shaft.

Figure 3:
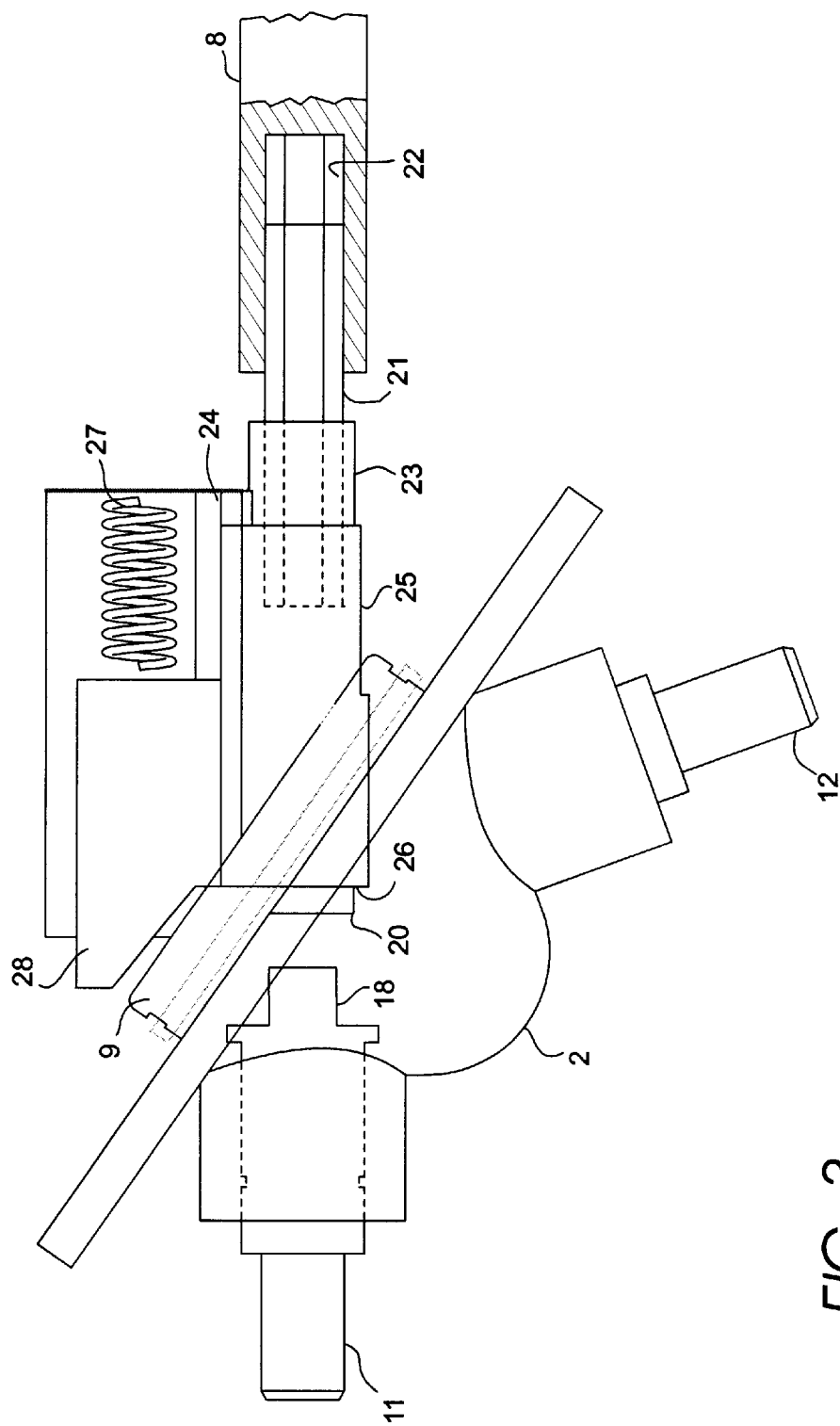
FIG. 3 is on a larger scale a fractional view of a coupling for the drill in FIGS. 1 and 2 in disconnected state.
Figure 4:
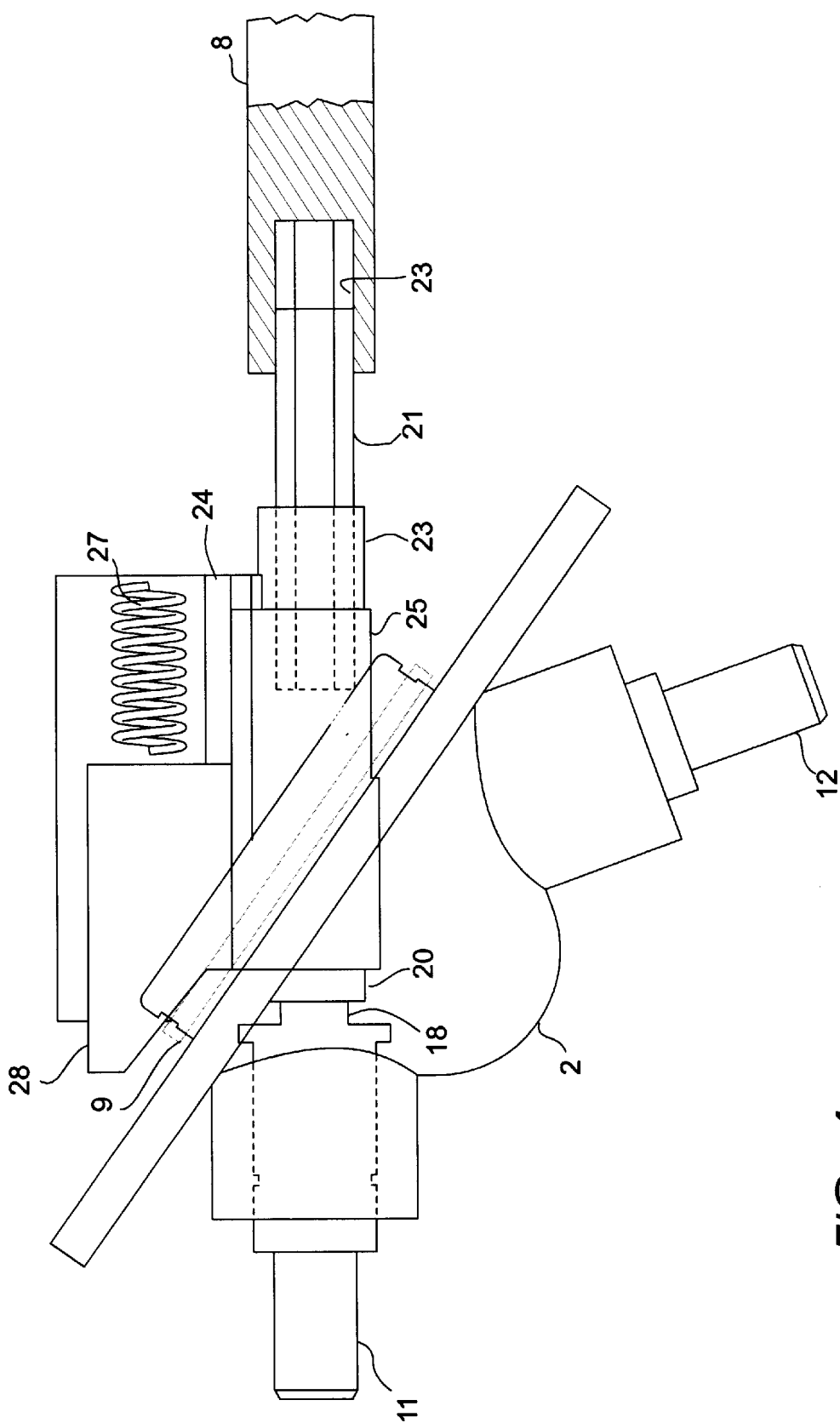
FIG. 4 is a view of the coupling in FIG. 3 but in connected state.

The coupling 17, which is seen best in FIG. 3 and FIG. 4, has a first coupling part 18; 19 on the end of the driven spindle 11 and 12 respectively, and an opposite second coupling part 20 which is connected to the driving spindle 8 in a non-rotatable but axially movable manner.

The coupling can be designed in any expedient manner, for example as a claw coupling (not shown).

In this case, the second coupling part 20 consists of a coupling bar 21 extending in an axially movable but non-rotatable manner into an axially extending end hole 22 in the driving spindle 8, and a bushing 23. The coupling bar is furthermore extending in a non-rotatable manner and secured against axial movement into or through the centre aperture of the bushing. In the case shown, the coupling bar and the end hole of the driving spindle and the centre aperture of the bushing respectively are hexagonal, but said securing against rotation can be established in any other expedient manner within the scope of the invention, for example as a key and slot coupling (not shown).

Connection takes place by pushing the second coupling part 20 forward and disconnection takes place by pulling the second coupling part 20 back. The coupling 17 is in a connected state in FIGS. 2 and 4 and a disconnected state in FIGS. 1 and 3.

A guideway 24 is furthermore mounted in the casing and is extending parallel to the axis of the drive shaft. A slide 25 is movably mounted in the guideway. The slide has a through channel 26 and the bushing 24 is extending through this channel in a rotatable but axially immovable manner. A coupling spring 27 serves for automatically moving the slide 25 and thereby the second coupling part 20 axially and coupling the coupling part 20 together with the first coupling part 18.

Figure 5:
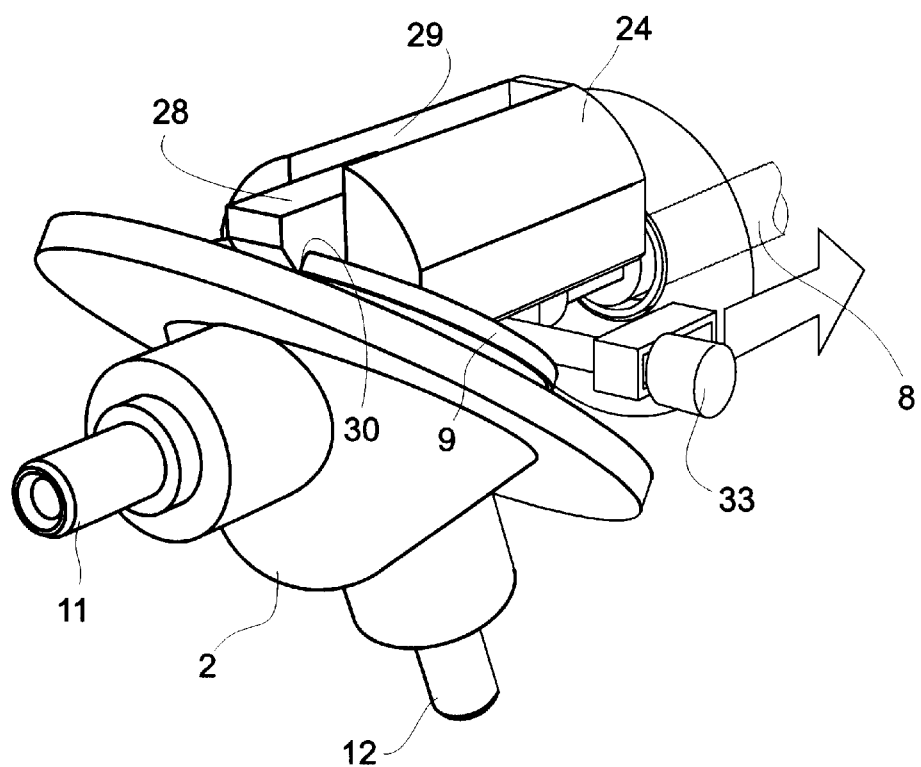
FIG. 5 is a fractional, perspective view of the turret head in FIGS. 1 and 2 in locked state.

A check pawl 28 is made on the slide and is received in a longitudinal slit 29 in the guideway 24 in a slidably movable manner. A corresponding locking notch 30 is made in the turret head. These details are seen best in FIGS. 5 and 6 which also show that the slide is provided with finger knobs 31 extending out through the casing.

When the operator has to change from e.g. the screw bit 14 in FIGS. 1 and 3 to the drill bit 16 in FIGS. 2 and 4, he manually pulls the finger knobs 31 and thereby the slide 25 back in the direction indicated by the arrow. As the second coupling part 20 of the coupling 17 is axially secured by the bushing 23 which again is axially secured by the slide 25, the second coupling part is disconnected from its engagement with the first coupling part 18. At the same time the pawl 28 is pulled out of its locking engagement with the locking notch 30 in the turret head 2.

Figure 6:
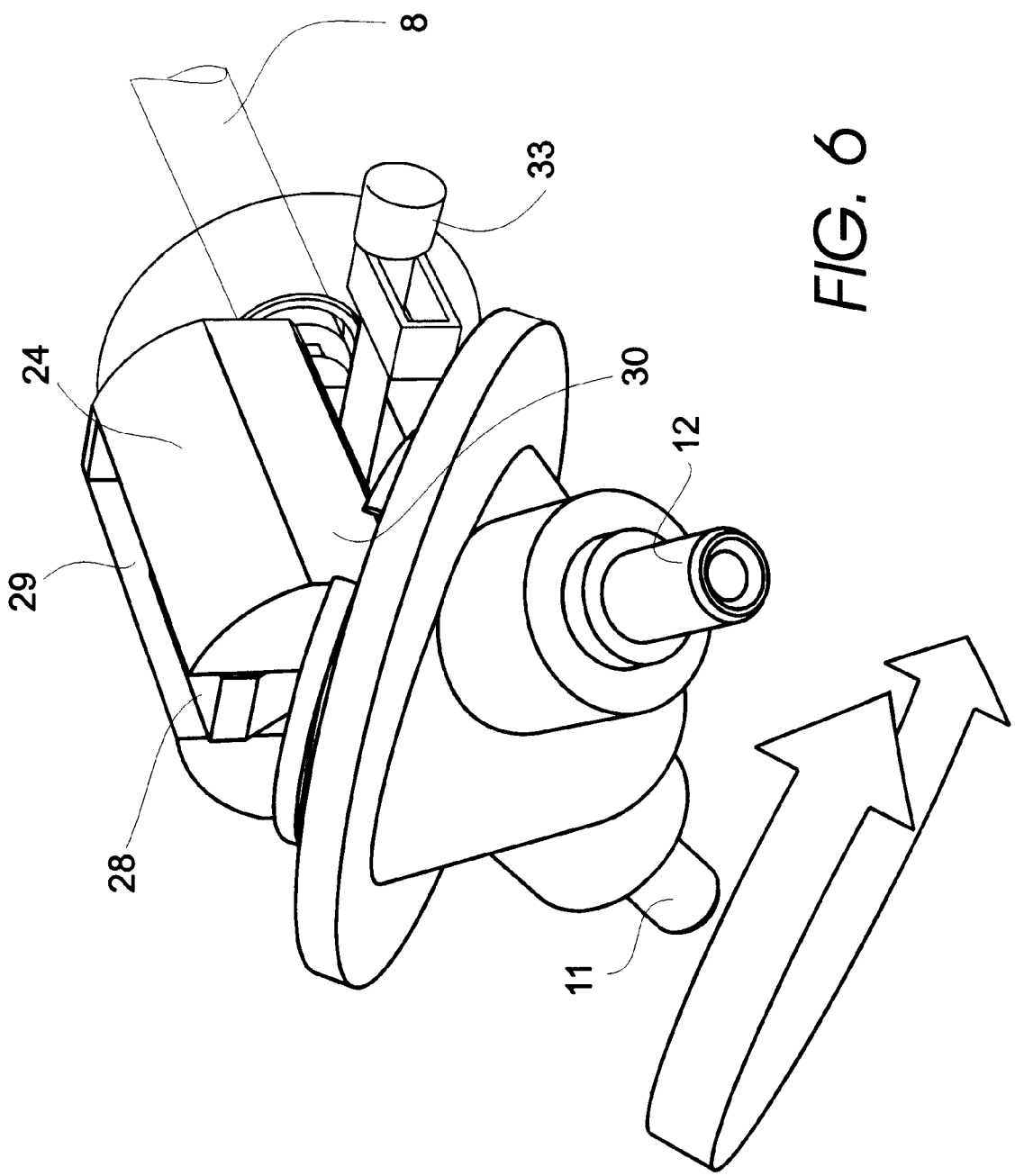
FIG. 6 is a view of the turret head in FIG. 5 but in unlocked state and during turning of the turret head.

In FIG. 6, both the coupling and the lock have been disconnected. Thereby, the turret head is allowed to be turned in the direction indicated by the arrow so that the drill bit 16 (not shown in FIGS. 5 and 6) now can be brought into the operatable position in which the corresponding driven spindle 12 is coaxially flushing with the driving spindle.

When the operator then releases the finger knobs 31, the coupling spring 27 will push the slide 25 forward in direction towards the first coupling part 18. Thereby, the driving spindle 8 and the driven spindle 12 are coupled together, and the turret head 2 is simultaneously locked in the casing 3 of the drill.

As can be seen, the drill according to the invention has a simple, safe and stably functioning structure which is easy to operate. As the turret head is automatically locked to the casing of the drill when the driven spindle is coupled to the driving spindle, the operator can operate the drill without any risk during this of getting hurt because of the turret head beginning to rotate during an operation.

Figure 7:
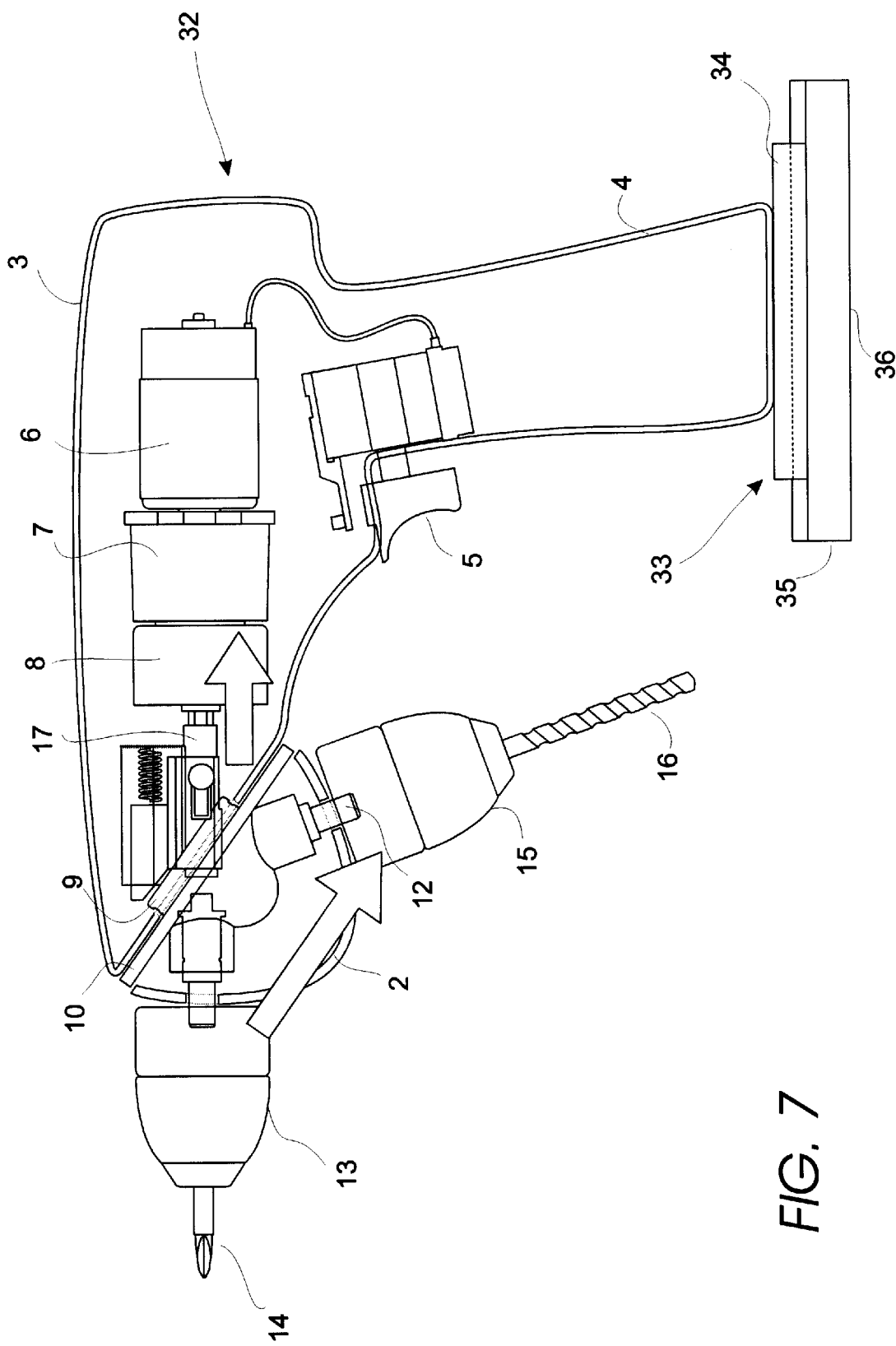
FIG. 7 is a second embodiment of the drill according to the invention provided with a movable base in a position of use.
Figure 8:
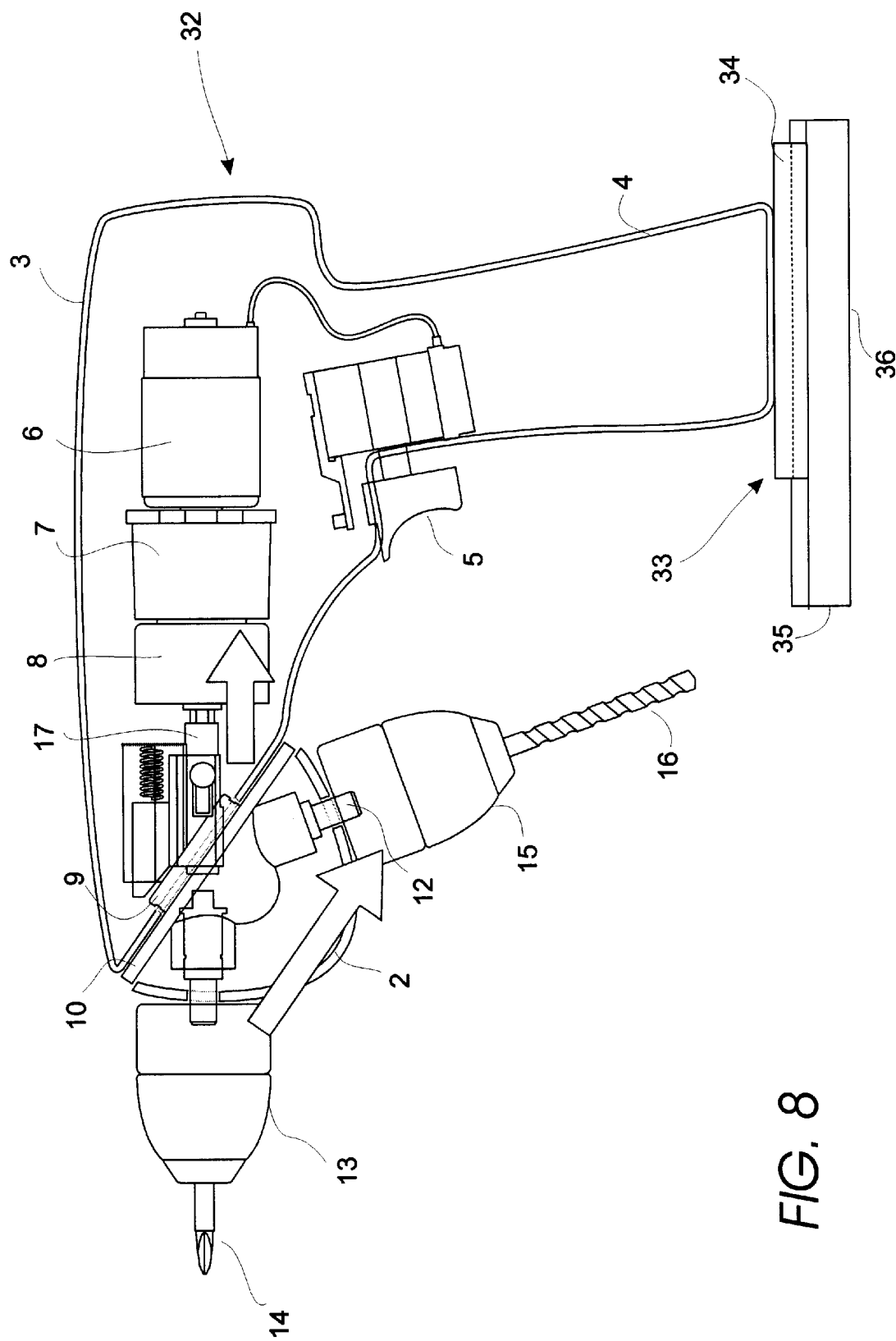
FIG. 8 is the embodiment in FIG. 7 but with the base in a position of rest.

FIGS. 7 and 8 show a second embodiment of the drill 32 according to the invention. This embodiment corresponds to the one described above and shown in FIGS. 1–6, and the common components will therefore not be described in detail again.

In this embodiment, the drill 32 has a base 33 for holding the drill when the operator puts the drill down on a supporting face. This base is constructed of a guideway 34 on the handle 4 and a slide 34 movably received in the guideway.

In FIG. 7, the slide is shown in a retracted position in which the slide does not inconvenience the operator during use of the drill.

In FIG. 8, the slide is in an advanced position in which its support surface 36, at least partly, is vertically beneath the total center of gravity of the drill and the turret head. In this position the drill can safely be placed on a supporting face 37.

In a preferred embodiment, the movable base comprises a rechargeable battery (not shown) for supplying the necessary power to the driving motor. Contacts (not shown) can be arranged in the base for connecting the battery to the motor when the drill is being used and disconnecting this connection when the base is pushed forward and the drill is placed on a supporting face.

The invention is described above and shown in the drawing on the assumption that the turret head is provided with two driven spindles having chucks with a screw bit and a drill bit respectively. Naturally, this is only to be taken as an example as the turret head within the scope of the invention can have several driven spindles each operating with any kind of rotary tool, of which screw bits, drill bits, cutters, broaches, circular saws, and grinders can be mentioned.

What is claimed is:

1. A hand-held drill comprising a casing; a driven spindle; a driving spindle rotatably journaled in the casing for engaging and rotating the driven spindle during operation, with the driven spindle being in an operatable position in which it is coaxially flush with the driving spindle; a driving motor for rotating the driving spindle; a coupling for connecting and disconnecting engagement of the driven spindle with the driving spindle, with the coupling including a first coupling part made on the end of the driven spindle that is facing the driving spindle, and an opposite second coupling part non-rotatably connected to the driving spindle and axially movable between a connected and disconnected position in relation to the driving spindle; a turret head revolvably mounted on the casing and provided with at least two driven spindles with the turret head arranged in such a way that the spindles can be rotated one by one into an operatable position with the driven spindle; means for manually displacing the second coupling part between its connected and disconnected positions; a guideway mounted in the casing and extending parallel to the axis of the driving spindle; and a slide movably received in the guideway and having a through channel extending coaxially with the driving spindle, whereby the second coupling part rotatably extends through the slide channel and is secured therein against axial movement.

2. The drill according to claim 1, which further comprises a lock having a first locking part on the turret head for each driven spindle and a second locking part on the slide, with the second locking part being arranged to engage in a locking manner with one of the first locking parts when the corresponding driven spindle is in the operatable position and the first and second coupling part are coupled together.

3. The drill according to claim 2, wherein the lock includes a locking pawl on the slide and a notch in the turret head for each driven spindle.

4. The drill according to claim 2, wherein the lock includes a locking pawl on the turret head for each driven spindle and a recess in the slide.

5. The drill according to claim 1, wherein the means for manually moving the second coupling part between its connected and disconnected position comprises a movable member associated with the second coupling part.

6. The drill according to claim 5, wherein the means for manually moving the second coupling part between its connected and disconnected position comprises a movable member associated with the slide.

7. The drill according to claim 6 wherein the movable member comprises at least one finger knob that extends out through the casing.

8. The drill according to claim 1, wherein the second coupling part is a coupling bar extending in an axially movable but non-rotatable manner into an axially extending end hole in the driving spindle and extending in a rotatable manner but secured against axial movement through the slide channel.

9. The drill according to claim 1, wherein the second coupling part comprises a bushing journaled in a rotatable manner but secured against axial movement in the channel of the slide and a coupling bar extending into or through the bushing in a non-rotatable manner and secured against axial movement and into an axially extending end hole in the driving spindle in a non-rotatable and movable manner.

10. The drill according to claim 1, which further comprises at least one biasing member for affecting the slide with a force acting in direction towards the driven spindle.

11. The drill according to claim 10, wherein the biasing member is a coupling spring that provides spring power against the slide.

12. The drill according to claim 1, which further comprises a base for supporting the drill on a supporting face, wherein a portion of the base is arranged to be moved between a retracted position of use and an advanced position of support.

13. The drill according to claim 1 wherein the motor drives directly or indirectly rotates the driving spindle.

* * * * *